UNITED STATES PATENT OFFICE.

FRANK OLIN RITTER, OF EDGEMOOR, DELAWARE, ASSIGNOR TO E. I. DU PONT DE NEMOURS & COMPANY, OF WILMINGTON, DELAWARE, A CORPORATION OF DELAWARE.

PROCESS FOR REDUCING ACIDITY OF OILS.

1,379,045.  Specification of Letters Patent.  Patented May 24, 1921.

No Drawing.  Application filed August 17, 1918. Serial No. 250,335.

*To all whom it may concern:*

Be it known that I, FRANK OLIN RITTER, of Edgemoor, in the county of New Castle and in the State of Delaware, have invented a certain new and useful Improvement in Processes for Reducing Acidity of Oils, and do hereby declare that the following is a full, clear, and exact description thereof.

My invention relates particularly to the treatment of vegetable and animal oils in order to decrease or remove the free fatty acids therein.

The object of my invention is to provide an advantageous process by means of which the free fatty acids in animal or vegetable oils can be reduced or removed. A further object is to remove such fatty acids by the use of an alkaline material for combining with the free fatty acids, then salting out the oil and soap from the liquid, and washing out the soap from the oil.

Further objects of my invention will appear from the detailed description thereof contained hereinafter.

While my invention is capable of being carried out in many different ways, for the purpose of illustration I shall describe only one way of carrying out the same hereinafter.

For example, I may proceed as follows:

23,600 grams of castor oil containing free fatty acids are treated with 785 grams of anhydrous sodium carbonate dissolved in 7,870 cubic centimeters of water. These materials are mixed together for approximately three hours, thus forming an emulsion, to which thereafter 31 liters of saturated brine are added while continuing the mixing. As a result, a very thick emulsion having the consistency of butter is produced, which is salted out from the brine. The brine is now drawn off, and the remaining emulsion is repeatedly washed with bodies of cold water, each of which amounts to approximately 15 liters, while stirring, the period of stirring after a particular washing operation being increased toward the end of the series of washing operations. In the case where there are ten washing operations, the time of stirring during the first washing will be one-half minute to five minutes, and the time of stirring during the tenth washing will be fifteen minutes. If desired also, the quantity of water used in a particular washing operation may be gradually increased as said operations proceed, until at the tenth washing operation 50 liters of water are used. After the end of each washing operation the layer of soapy water below the layer of oil is drawn off. Furthermore, the last washing operation may be carried out with hot water. When the washing operations have been completed, the oil is heated to from 90° to 100° C., by any desired means, and maintained at this temperature for approximately two hours. The oil, as a result, collects in a uniform body, and may be drawn off as a finished product.

It will be understood that instead of the sodium carbonate, other alkaline substances may be used, and that instead of the brine other salts may be used for salting out.

While I have described my invention above in detail, I wish it to be understood that many changes may be made therein without departing from the spirit thereof, By the term oil used herein, I mean to refer to any fatty material while in a liquid state.

I claim:

1. The process which comprises treating an oil containing a free fatty acid with a solution of an alkaline substance to form an emulsion, salting out the oil and soap, the said oil and soap separating together as an emulsion, and then washing out the soap thus formed.

2. The process which comprises treating an oil containing a free fatty acid with a solution of an alkaline substance to form an emulsion, salting out the oil and soap, the said oil and soap separating together as an emulsion, and then washing out the soap thus formed with the aid of a solvent.

3. The process which comprises treating an oil containing a free fatty acid with a solution of an alkaline substance to form an emulsion, salting out the oil and soap, the said oil and soap separating together as an emulsion, and then washing out the soap thus formed with the aid of water.

4. The process which comprises treating an oil containing a free fatty acid with a solution of an alkaline substance to form an emulsion, salting out the oil and soap, the said oil and soap separating together as an emulsion, and then washing out the soap thus formed with the aid of water by successive washings and successive removals of the bodies of wash water.

5. The process which comprises treating an oil containing a free fatty acid with a solution of sodium carbonate to form an emulsion, salting out with brine the oil and soap, the said oil and soap separating together as an emulsion, and then washing out the soap thus formed.

6. The process which comprises treating an oil containing a free fatty acid with a solution of sodium carbonate to form an emulsion, salting out with brine the oil and soap, the said oil and soap separating together as an emulsion, and then washing out the soap thus formed with the aid of a solvent.

7. The process which comprises treating an oil containing a free fatty acid with a solution of sodium carbonate to form an emulsion, salting out with brine the oil and soap, the said oil and soap separating together as an emulsion, and then washing out the soap thus formed with the aid of water.

8. The process which comprises treating an oil containing a free fatty acid with a solution of sodium carbonate to form an emulsion, salting out with brine the oil and soap, the said oil and soap separating together as an emulsion, and then washing out the soap thus formed with the aid of water by successive washings and successive removals of the bodies of wash water.

In testimony that I claim the foregoing I have hereunto set my hand.

FRANK OLIN RITTER.

Witnesses:
G. D. HOPKINS,
STANLEY L. ABRAMS.